US009467781B2

(12) United States Patent
Meesters

(10) Patent No.: US 9,467,781 B2
(45) Date of Patent: Oct. 11, 2016

(54) HEADSET LOOP ANTENNA FOR AUDIO DEVICES

(71) Applicant: NXP B.V., Eindhoven (NL)

(72) Inventor: Cor Meesters, Sint Anthonis (NL)

(73) Assignee: NXP B.V., Eindhoven (NL)

(*) Notice: Subject to any disclaimer, the term of this patent is extended or adjusted under 35 U.S.C. 154(b) by 174 days.

(21) Appl. No.: 14/478,216

(22) Filed: Sep. 5, 2014

(65) Prior Publication Data

US 2014/0376724 A1 Dec. 25, 2014

Related U.S. Application Data

(62) Division of application No. 12/809,929, filed as application No. PCT/IB2008/054438 on Oct. 28, 2008, now Pat. No. 8,855,353.

(30) Foreign Application Priority Data

Dec. 20, 2007 (EP) .................................... 07123802

(51) Int. Cl.
*H04R 5/04* (2006.01)
*H01Q 1/27* (2006.01)
(Continued)

(52) U.S. Cl.
CPC ................ *H04R 5/04* (2013.01); *H01Q 1/273* (2013.01); *H01Q 7/00* (2013.01); *H01Q 9/30* (2013.01)

(58) Field of Classification Search
CPC ........ H04R 5/04; H04R 5/033; H04Q 1/273; H04Q 7/00; H04Q 9/30
USPC ............. 381/15-20; 455/90.3, 550.1, 569.1, 455/575.1, 575.5
See application file for complete search history.

(56) References Cited

U.S. PATENT DOCUMENTS

| | | | |
|---|---|---|---|
| 5,438,698 | A | 8/1995 | Burton et al. |
| 7,064,720 | B2 | 6/2006 | Yoshino |
| 2005/0094840 | A1 | 5/2005 | Harano |

(Continued)

FOREIGN PATENT DOCUMENTS

| | | | |
|---|---|---|---|
| JP | 60-240221 | A | 11/1985 |
| JP | 2005-086701 | A | 3/2005 |

(Continued)

OTHER PUBLICATIONS

International Search Report for Int'l. Patent Appln. No. PCT/IB2008/054438 (Jun. 9, 2009).

*Primary Examiner* — Melur Ramakrishnaiah

(57) ABSTRACT

The present invention relates to a headset device, an audio device and methods of receiving a radio signal via the headset device, wherein the headset device comprises at least one first conductor for supplying an audio signal to a respective earpiece, a second conductor arranged in a loop configuration for providing a magnetic antenna, and a connector (50) having at least one respective first connecting portion (3, 4) for providing a connection to the at least one first conductor (140), a second connecting portion (1) for providing a connection to a first end of the second conductor (70), and a third connecting portion (2) for providing a connection to a second end of the second conductor (70), wherein an output of the magnetic antenna is provided between the second and third connecting portions (1, 2). At the audio device, an impedance transformer (10) is coupled to the second and third connecting portions at its primary side and to an amplifier (20) at its secondary side.

6 Claims, 2 Drawing Sheets

(51) Int. Cl.
*H01Q 7/00* (2006.01)
*H01Q 9/30* (2006.01)

(56) References Cited

U.S. PATENT DOCUMENTS

2005/0285799 A1 12/2005 Leinoen et al.
2006/0014560 A1* 1/2006 Yoshino .................. H01Q 1/46 455/550.1
2009/0004977 A1* 1/2009 Piovaccari ........... H04B 1/3877 455/90.3

FOREIGN PATENT DOCUMENTS

JP 2006-338957 A 12/2006
WO 03/026342 A2 3/2003
WO 2007/042855 A1 4/2007

* cited by examiner

HEADSET LOOP ANTENNA FOR AUDIO DEVICES

CROSS-REFERENCE TO RELATED APPLICATIONS

This application is a divisional of copending U.S. patent application Ser. No. 12/809,929 filed Sep. 20, 2010.

FIELD OF THE INVENTION

The present invention relates to a headset device, an audio device and methods for operating such devices. More specifically, the present invention relates to an active external wide hand loop antenna incorporated into a headset to enable radio reception.

BACKGROUND OF THE INVENTION

In audio devices, radio reception in the AM frequency range is normally achieved by providing an internal ferrite antenna. Such ferrite antennas are configured for a predetermined frequency band in the radio spectrum. The ferrite antenna provides the functions of both an antenna receiving the magnetic part of the electromagnetic wave, and a resonant circuit with an additional capacitance. The first stage of a subsequent antenna amplifier may then have a wide band configuration, while selectivity is obtained in the second amplifier stage.

Such ferrite antennas may be disadvantageous in that internally generated electromagnetic fields (e.g. from a central processing unit (CPU), a microcomputer (μC) or the like) are picked up as noise. Additionally, the physical dimensions of the internal ferrite antenna are a key factor for sensitivity of AM reception. Increased miniaturization of audio devices with radio receivers requires smaller ferrites, which leads to undesirable decreases in sensitivity of radio reception.

By putting the AM antenna outside the housing, sensitivity can be increased and additional area can be made available on a printed circuit board (PCB) by removing the ferrite. This freed area can be used for other circuit elements.

One placing option for external radio antennas may be a headset of the audio device. This is suggested for example in the US 2005/0285799 A1 which discloses a headset loop antenna implemented by loop sections which include inductors and wherein conductors to the earplugs contain ferrite beads. Each conductor in the loop section forms a matching element in that it matches to the desired reception frequency of the loop antenna. The loop antenna segments are coupled to one another and to a conductive antenna lead section at a Y-type coupler. Alternatively, the two antenna loop segments may be joined directly at a plug of the headset.

However, to emulate the presence of a ferrite antenna and/or to tune the loop antenna to the desired frequency range, proper selection of the inductors within the antenna loop configuration is crucial for matching the antenna to the receiver circuit and frequency range.

SUMMARY OF THE INVENTION

It is therefore an object of the present invention to provide a headset loop antenna and an audio device, by means of which impedance adjustment and tuning is facilitated.

In a first aspect of the present invention a headset device is presented which comprises:

at least one first conductor for coupling an audio signal to a respective earpiece;

a second conductor arranged in a loop configuration for providing a magnetic antenna; and a connector having at least one respective first connecting portion for providing a connection to said at least one first conductor, a second connecting portion tier providing a connection to a first end of said second conductor, and a third connecting portion for providing a connection to a second end of said second conductor, wherein an output of said magnetic antenna is provided between said second and third connecting portions.

In a further aspect of the present invention an audio device is presented which comprises:

a connector for removable coupling a headset device, said connector comprising at least one first connecting portion for supplying an audio signal to said headset device, and second and third connecting portions for receiving from said headset device an antenna signal; and an impedance transformer coupled to said second and third connecting portions at its (primary side and to an amplifier at its secondary side.

In a further aspect of the present invention a method of receiving a radio signal via a headset device is presented, said method comprising:

providing a connector for connecting said headset device;

using separate connecting portions of said connector for receiving said radio signal from a magnetic loop antenna arranged on said headset device; and performing an impedance transformation before supplying said radio signal to an amplifier.

In a further aspect of the present invention a method of receiving a radio signal via a headset device is presented, said method comprising:

providing in said headset device a conductor in a loop configuration on as to form a magnetic antenna;

connecting first and second ends of said conductor to separate connecting portions of a connector of said headset device; and supplying an output signal of said magnetic antenna via said separate connecting portions.

Accordingly, a loop antenna is provided outside the housing of the audio device, so that sensitivity can be increased due to less influence by internal circuits of the audio device. Additionally, since both ends of the loop antenna are connected to separate connecting portions of the connector or plug of the headset device, tuning and matching functions can be moved to the audio device. The loop section of the headset device can thus be implemented by a simple conductor or single wire in the headset device. Moreover, the loop antenna does not need to be tuned, so that no matching and/or tuning elements are needed. Matching and tuning can be achieved by the impedance transformer and an optional resonant transformer provided in the audio device for receiving an output signal of the differential amplifier, wherein the resonant transformer can be connected to an antenna input of a signal processing circuit and can be adapted as a resonance circuit towards the signal processing circuit. Thereby, tuning and selectivity can be adjusted at the resonant transformer. Thus, the initially mentioned conventional functions allocated to the ferrite antenna, namely reception and resonance, have been separated into different stages.

By using a single continuous wire for forming the conductor, the magnetic loop antenna can be worn like a necklace when the headset is placed on the head of a user.

Additionally, the magnetic loop antenna may be used as an electric antenna, wherein at least one of the separate connecting portions is used for supplying an antenna output signal of the electric antenna. Hence, the conductor in the loop configuration can be used as a multi-purpose antenna for different frequency ranges, such as the AM band (magnetic loop antenna mode) and the FM band (electric antenna mode). Of course, the antenna conductor in the loop configuration can be configured for radio reception in other frequency bands, such as Long Wave (LW), Short Wave (SW), Digital Video Broadcast for Handheld devices (DVB-H), Digital Radio Mondial (DRM) and so on.

The signal processing circuit may comprise an AM radio receiver circuit. As an additional option, a second radio receiver circuit (e.g. an FM radio receiver circuit) may be coupled to at least one of the second and third connecting portion, so as to receive an antenna signal in a different frequency band.

Various embodiments or modifications of the present invention are defined in the dependent claims.

BRIEF DESCRIPTION OF THE DRAWINGS

These and other aspects of the invention will be apparent from and elucidated with reference to the embodiments described hereinafter. In the following drawings.

DESCRIPTION OF THE PREFERRED EMBODIMENTS

Embodiments of the present invention will now be described based on an AM headphone antenna for a portable audio device.

Figure 1:
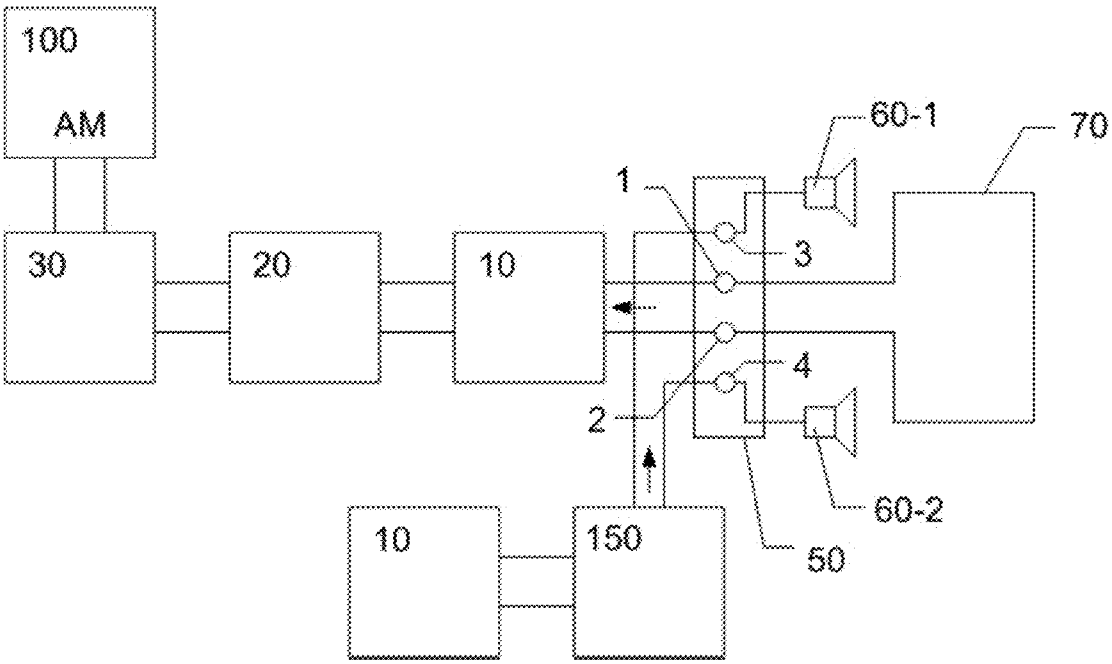
FIG. 1 shows a schematic block diagram of an audio device with detachable headset device according to a first embodiment.

FIG. 1 shows a schematic block diagram of the audio device and the headphone or headset, which are connected via a connector arrangement 50 (e.g. a plug-socket arrangement). The headset comprises two earpieces 60-1 and 60-2 for left and right audio output and a conductor 70 in a loop configuration, which forms a magnetic loop antenna and may optionally as well be used as an electric antenna. The two earpieces 60-1 and 60-2 are connected to respective connecting portions (e.g. connecting pads, connecting pins or the like) 3 and 4 of the connector arrangement 50. Additionally, the two ends of the connector 70 in the loop configuration are connected to respective connecting portions (e.g. connecting pads, connecting pins or the like) 1 and 2 of the connector arrangement 50. The connector arrangement 50 thus consists of two separate parts, one (e.g. a socket) provided at the audio device and the other provided at a connector (e.g. a plug) at the end of a cable of the headset device.

As can be gathered from FIG. 1, the two connector portions 3 and 4 which provide a connection to the respective earpieces 60-1 and 60-2 are connected within the audio device via a filtering block 150 to an audio output of an audio signal processing stage 40 which may comprise for example a base band processing stage and at least one amplifier stage of a radio unit or any other audio unit such as an MP3 player or the like. The other connecting portions 1 and 2 of the connector arrangement 50 provide a differential antenna signal and are connected to an impedance transformer stage 10 which is configured to transform the low impedance of the conductor 70 in loop configuration to a higher impedance required for substantial matching with a differential amplifier stage 20 in which the differential antenna signal is amplified. The output of the differential amplifier stage 20 is connected to a resonant transformer stage 30 which introduces tuning and selection functionalities for better selectivity and noise reduction due to the differential signal handling. The output signal of the resonant transformer stage 30 is supplied to an AM radio receiver stage 100, where the received antenna signal is demodulated and processed to obtain abuse band audio signal which could then be supplied to the audio signal processing stage 40, for example.

Hence, in the first embodiment, an external wide band loop antenna for MW reception is incorporated into a headset. More specifically, an AM antenna is put into the headset wiring by creating a loop. This external loop replaces the need to use a conventional internal AM ferrite antenna. The loop may be created with a modified headset wire, so that the headset cable now comprises respective wires for left and right audio signals and antenna wires for conveying the differential antenna signal. Due to the fact that two connecting portions are provided for the differential antenna signal at the connector arrangement 50, the loop winding can easily be connected to a differential wide band amplifier in the differential amplifier stage 20 through an impedance transformer of the impedance transformer stage 10.

The secondary winding of the resonant transformer of the resonant transformer stage 30 can be connected to an AM antenna input of the AM radio receiver stage 100. Thus, the loop antenna of the headset in combination with the above stages 10 to 30 forms an active external wide band loop antenna for MW reception.

Figure 2:
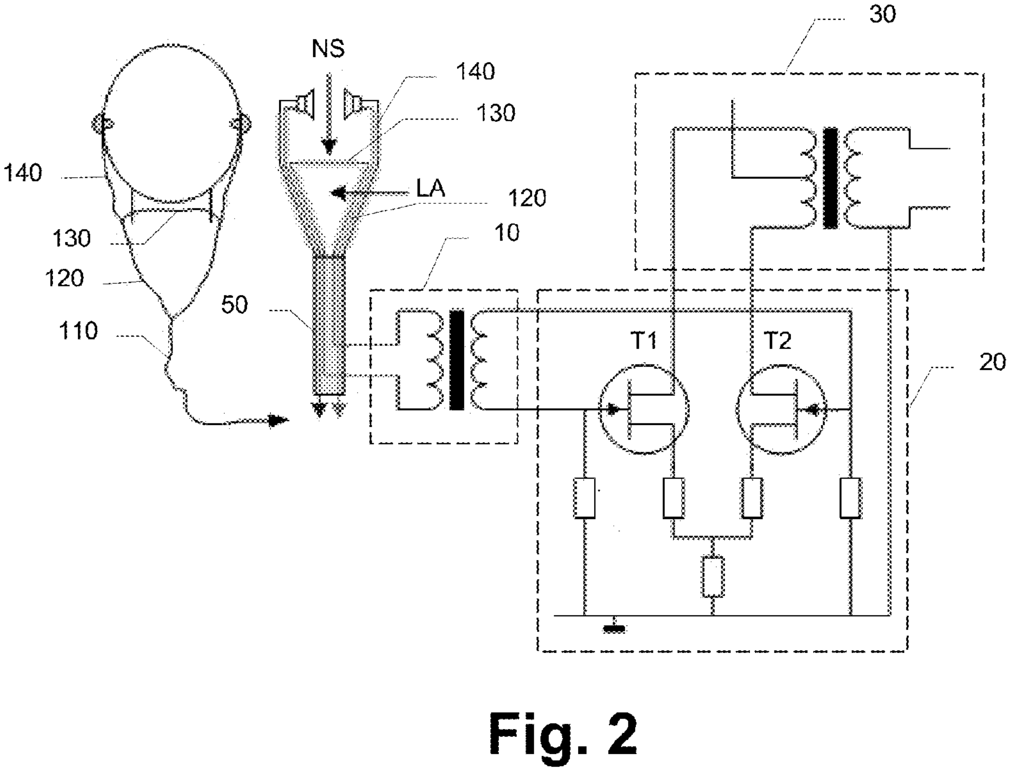
FIG. 2 shows a more detailed block diagram with schematic headset and circuit configurations according to the first embodiment.

FIG. 2 shows a more detailed block diagram with additional schematic circuit configurations and an exemplary headset configuration according to the first embodiment.

The upper left portion of FIG. 2 schematically shows the head of a user which wears a headset according to an embodiment of the present invention. A first cable portion 110 of the headset includes all audio and antenna wires and is connected at one end to a connector plug for connecting to an audio device, and is split up at the other end into branch sections 120 which include a respective one of the audio wires and a loop section of the connector 70 of FIG. 1. Both branch sections 120 comprise an additional branch section which splits up into a bridge section 130 of the loop configuration and respective earpiece sections 140 leading to the respective earpiece of the headset.

As can be gathered from the adjacent schematic drawing of the wires within the headset, the loop configuration of the magnetic loop antenna can be provided by a single antenna conductor connected to respective connecting portions of the connector arrangement 50. Additionally, the earpieces may be connected to two respective audio wires, one of which being connected to ground or another reference potential of the audio device, and the other wire leading to an audio output stage of the audio signal processing stage 40. The bridge section 130 of the loop configuration may be configured as a neck-strap (NS) so that a loop area (LA) is formed, through which the neck of the user extends. Optionally, the neck-strap can be of a removable kind, e.g. a ‘conductive click-connection’.

Furthermore, FIG. 2 shows an impedance transformer of the impedance transformer stage 10 which is directly connected to the conductor 70 in the loop configuration. If the magnetic loop antenna of the headset is implemented by a single wire with only one winding, it has very low inductance (e.g. 0.5 μH). If AM frequencies around 1 MHz are received, the reactance XL will be around 3Ω. This is a very low resistance. The field effect transistors (FET) T1 and T2 provided in the differential amplifier stage 20 and configured to amplify the received antenna signal have a gate with a high impedance. Thus, an impedance transformation is required for matching purposes. This impedance transformation is achieved by selecting a suitable winding ratio at the impedance transformer.

If the secondary coil of the impedance transformer has a higher number of windings, a higher antenna impedance is seen by the FETs T1 and T2. If the impedance transformation leads to an inductance of about 1 mH, the reactance XL will be 6 kΩ so that sufficient signal power is available for the FETs T1 and T2.

The amplified output signal of the differential amplifier stage 20 is supplied to a second transformer of a resonant type provided in the resonant transformer stage 30. In the present embodiment, this resonant transformer converts the differential signal into a non-differential signal, so that the secondary winding of the resonant transformer can be connected to ground at one end. Thereby, the antenna signal received at the headset is supplied to the AM radio receiver stage 100 from a resonant type output stage. The permeability coefficient μ of the resonant transformer material determines the quality Q or bandwidth of the resonance. A low μ will lead to a high Q and will thus lead to an increased selectivity. A resonant transformer with a higher μ leads to a lower Q and will thus lead to an increased bandwidth. The resonant circuit of the resonant transformer stage 30 may as well be created with an air-coil with a predetermined higher number of windings.

As regards possible core configurations of the impedance transformer and the resonant transformer, toroid-cores may be selected. However other shapes of cores can be used as well, such as an I-core or an E-core, where winding of the coil is facilitated compared to a toroid-core.

A central tap at the primary winding of the resonant transformer may be connected to a DC voltage $V_{DC}$ which is used as a supply voltage of the FETs T1 and T2. Additionally, the central tap may be connected to ground via a capacitor so that it is virtually connected to ground for high frequency signals, such as the differential high-frequency antenna signal. Furthermore, the capacitor connected to the central tap of the resonant transformer, compensates for a long Vdc-PCB track from the DC voltage $V_{DC}$ to the transformer. With the capacitor connected close to the central tap, the Vdc-PCB track does not function as an uncoupled piece of transformer winding.

Figure 3:
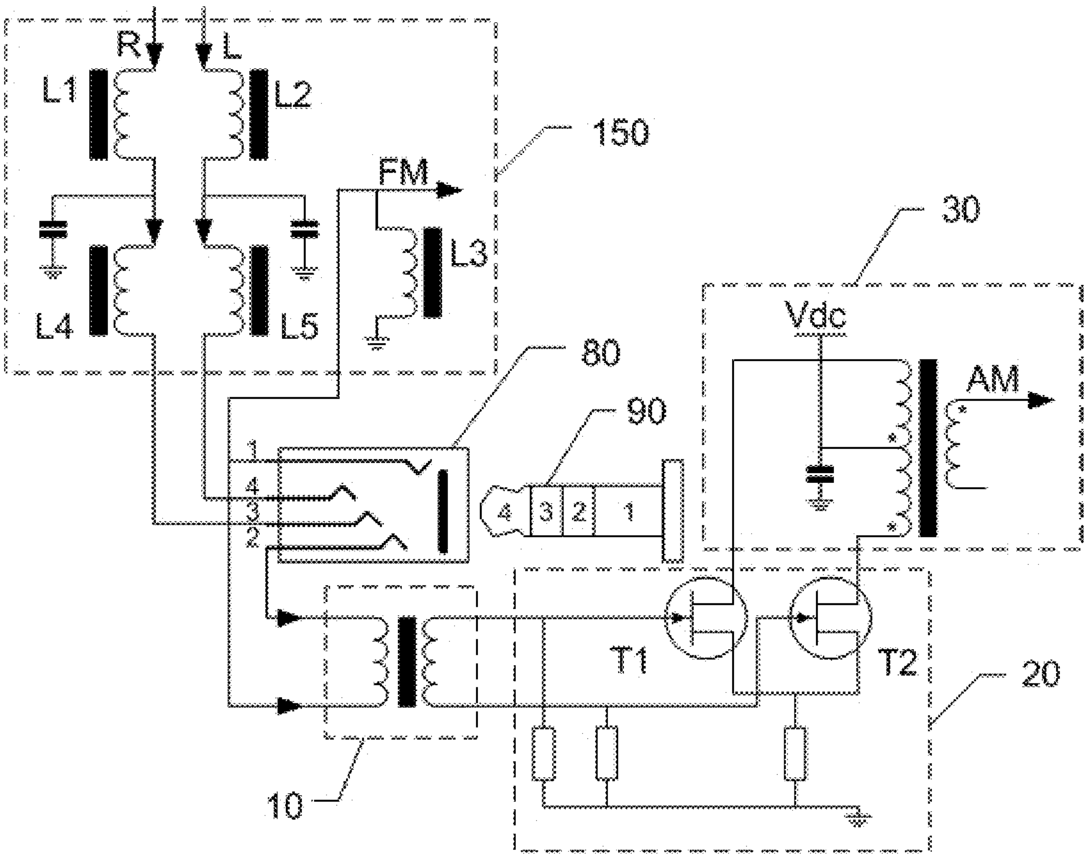
FIG. 3 shows a schematic circuit diagram with plug and socket configuration according to a second embodiment.

FIG. 3 shows a schematic circuit diagram and a more detailed configuration of the connector arrangement 50 of FIGS. 1 and 2 according to a second embodiment. As can be gathered from FIG. 3, the left and right audio signals are supplied to the connecting portions 3 and 4 of a socket 80 via respective decoupling inductors L1 and L2 of the filtering block 150. The inductors L1 and L2 can be adapted to form a band-reject filter for frequencies in the FM-band and are thus advantageous for cases where the ground line is used as an FM antenna. Moreover, the filtering block 150 may comprise low-pass filter sections with additional inductors L4 and L5 added to remove frequencies in the AM band.

Additionally, in the second embodiment, the connecting portions 1 and 2 of the socket 80 are not only connected to the impedance transformer stage 10 which forwards the differential antenna signal via the differential amplifier stage 20 to the resonant transformer stage 30. As an additional measure, the connecting portion 1 is supplied to an FM receiving stage, so that an additional antenna signal in the FM frequency range (where the headset antenna operates as an electric antenna) can be received and processed as a non-differential signal. The FM output is also connected to ground via a third inductor L3 of the filtering block 150, so that this connector portion can be used as a ground electrode for low frequency audio signals.

FIG. 3 also shows an exemplary arrangement of the connecting portions 1 to 4 on the plug of the connector portion 50. This plug is provided at the end of the headset cable, so that electric connection is established when the connecting portions of the plug 90 are inserted into a respective reception portion (e.g. a matched hole) of the socket 80. Of course, any other connector arrangement can be used in the present embodiment. The socket 80 may for example be arranged as a surface mounted device (SMD). It is noted that the socket 80 may as well comprise more than the above four connecting portions (or poles) 1 to 4.

Thus, in the second embodiment, the same wire of the magnetic antenna, which is used for the AM band (522 to 1700 kHz), also acts as an electric antenna for the FM band (88 to 108 MHz). The embodiment can be modified for the HF band (3 to 30 MHz) for reception of other RF signals. Both AM and FM functionality of the headset antenna are based on a non-resonant wide band reception.

According to the above embodiments, a loop antenna for mobile use is proposed, which is incorporated in the headset. At the audio device, impedance adjustment between the loop antenna and a radio reception or tuner circuit is achieved by the impedance transformer stage 10 and the resonant transformer stage 30 to emulate the presence of a ferrite antenna. The impedance adjustment comprises an impedance transformer coupled to the antenna on one side and to the input of the differential amplifier stage 20 on the other side, while the output of the differential amplifier stage 20 is coupled to the primary winding of a resonant transformer at the resonant transformer stage 30, which may be the output stage of an impedance adjustment arrangement. The secondary winding of the resonant transformer is connected to an AM antenna input of the radio receiver or tuner circuit. On the antenna side, the loop can be formed by a single wire (which may be a DC ground wire of the headset) and a fourth additional wire in the headset (in addition to wires for left audio, right audio and ground). This DC ground wire may optionally also function as an electric FM antenna and may then be connected to ground via an inductance, thereby serving as a ground electrode for audio signals.

To summarize, a headset device, an audio device and methods of receiving a radio signal via the headset device have been described, wherein the headset device comprises at least one first conductor for supplying an audio signal to a respective earpiece, a second conductor arranged in a loop configuration for providing a magnetic antenna, and a connector 50 having at least one respective first connecting portion 3, 4 for providing a connection to the at least one first conductor 140, a second connecting portion 1 for providing a connection to a first end of the second conductor 70, and a third connecting portion 2 for providing a connection to a second end of the second conductor 70, wherein an output of the magnetic antenna is provided between the second and third connecting portions 1, 2. At the audio device, an impedance transformer 10 is coupled to the second and third connecting portions at its primary side and to an amplifier 20 at its secondary side.

While the invention has been illustrated and described in detail in the drawings and foregoing description, such illustration and description are to be considered illustrative or exemplary and not restrictive. The invention is not limited to the disclosed embodiments.

Other variations to the disclosed embodiments can be understood and effected by those skilled in the art in practicing the claimed invention, from a study of the drawings, the disclosure and the appended claims. More specifically, the specific circuit arrangements of the impedance transformer stage 10, the differential amplifier stage 20, the resonant transformer stage 30 and the configuration of the connector arrangement 50 may be replaced by other circuit configurations of same or similar functionality. Furthermore, the embodiments are not limited to a differential antenna output and will also work with a non-differential single ended approach, e.g., where the a ground wire or conductor is used as the return path. Thereby, amplifying device(s) (e.g. one of FETs T1 and T2 can be saved).

In the claims, the word "comprising" does not exclude other elements or steps, and the indefinite article "a" or "an" does not exclude a plurality. A single means, units, or devices may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. An audio device comprising:

a connector for coupling a headset device, said connector being user removable and comprising a first connecting portion for supplying an audio signal to said headset device, and a second and third connecting portions for receiving from said headset device a first antenna signal;

an impedance transformer having a primary side and a secondary side, the primary side coupled to said second and third connecting portions, and the secondary side coupled to an amplifier; and a resonant transformer coupled to an output of said amplifier and to an antenna input of a signal processing circuit, and adapted to act as a resonant circuit towards said signal processing circuit.

2. The audio device according to claim 1, wherein said signal processing circuit comprises an AM radio receiver circuit.

3. The audio device according to claim 2, further comprising a second radio receiver circuit coupled to at least one of said second and third connecting portions, so as to receive a second antenna signal in a different frequency band than the frequency band of the first antenna signal.

4. The audio device according to claim 1, further comprising a second radio receiver circuit coupled to at least one of said second and third connecting portions, so as to receive a second antenna signal in a different frequency band than the frequency band of the first antenna signal.

5. A method of receiving a radio signal via a headset device, said method comprising:

providing a connector for connecting said headset device;

receiving, at first and second connecting portions of said connector, said radio signal from a magnetic loop antenna arranged on said headset device;

performing an impedance transformation before supplying said radio signal to an amplifier; and supplying an output signal of said amplifier via a resonant circuit to an antenna input of a signal processing circuit.

6. The method according to claim 5, wherein the resonant circuit comprises a resonant transformer.

* * * * *